No. 664,888. Patented Jan. 1, 1901.
J. E. NORWOOD.
SIDE BEARING FOR RAILWAY CARS.
(Application filed May 11, 1900.)
(No Model.)
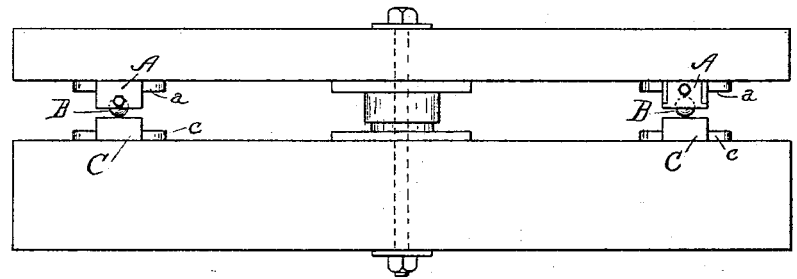
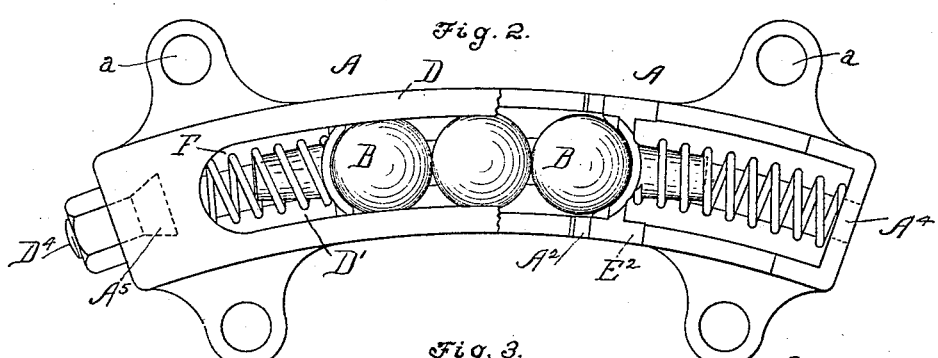
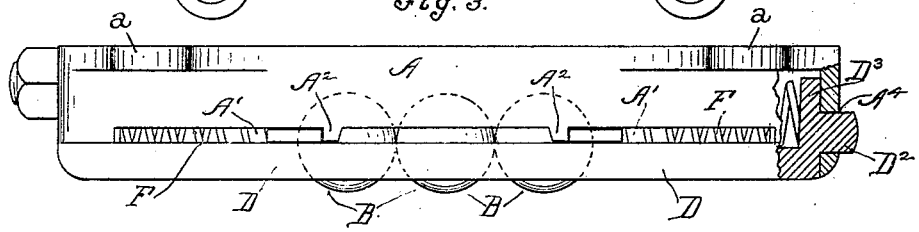
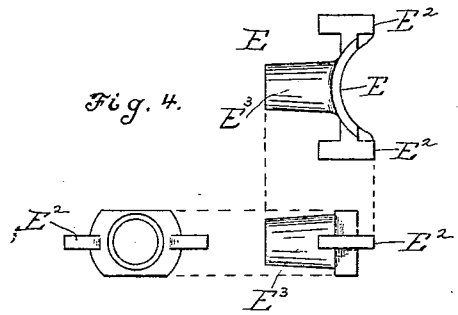
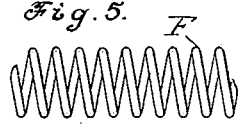
Witnesses:-
Wm. H. Vail.
F. S. Stitt.
Inventor:-
John E. Norwood
By Chas. B. Mann
Attorney.
THE NORRIS PETERS CO., PHOTO-LITHO., WASHINGTON, D. C.

UNITED STATES PATENT OFFICE.

JOHN E. NORWOOD, OF BALTIMORE, MARYLAND, ASSIGNOR TO THE BALTIMORE BALL BEARING COMPANY OF BALTIMORE CITY, OF MARYLAND.

SIDE BEARING FOR RAILWAY-CARS.

SPECIFICATION forming part of Letters Patent No. 664,888, dated January 1, 1901.

Application filed May 11, 1900. Serial No. 16,263. (No model.)

*To all whom it may concern:*

Be it known that I, JOHN E. NORWOOD, a citizen of the United States, residing at Baltimore, State of Maryland, have invented certain new and useful Improvements in Side Bearings for Railway-Cars, of which the following is a specification.

My invention relates to side bearings for railway-cars, and has for its object certain improvements in devices of this character whereby all undue strain will be prevented and whereby the bearing will be automatically centered.

The invention consists in certain details of construction and arrangements of the parts, which will be hereinafter fully described and claimed.

Reference is to be had to the accompanying drawings, forming part of this specification, in which like characters of reference indicate corresponding parts in all the views.

Figure 1 is a side elevation of the bolsters of a railway-car, between which my improved side bearings are located. Fig. 2 is a bottom plan view of the upper part of the bearing, containing the balls and centering devices therefor. Fig. 3 is an edge view thereof at right angles to Fig. 2, illustrating the guides for the centering devices. Fig. 4 is a detail view illustrating one of the centering-heads shown detached. Fig. 5 is a detail view of one of the springs employed.

My improved bearing, as shown in Fig. 1, is designed to be located near the ends of the bolsters of a railway-car or similar vehicle and comprises an upper casing A, arranged to contain the balls B, which ride upon the lower bearing-plate C, which latter and the casing A have the usual attaching-ears $c$ and $a$. The said casing A is preferably of segmental form, as shown particularly in Fig. 2, and the side edges of its body portion are cut out or recessed, as shown at A', Fig. 3, a cap-plate D being secured to the said body portion, whereby to form guideways for the centering-heads, hereinafter described. The cap-plate D is open for a portion of its length, and such opening (designated by D') is of a width less than the diameter of the balls B, whereby the balls will be retained in the casing A and yet be capable of moving longitudinally therein, with their surfaces projecting slightly outside the casing to contact with the lower bearing-plate C. Now in order to automatically center the balls B in the casing I provide centering devices (shown in detail in Fig. 4) consisting of heads E, each of which is formed with a concave seat E', corresponding to the surface or contour of the balls and in which the end balls are designed to be seated, as shown particularly in Fig. 2. Beyond the seat E' project guides $E^2$, preferably in the form of rectangular ears, as shown, said guides being fitted to slide within the guideways A' and abutting at the inward limit of their movement against stop-lugs $A^2$, formed integral with the body portion of the casing A. Each centering-head is further formed in the rear of its concave seat with a preferably-rounded and slightly-tapering shank $E^3$, over which is inserted one end of a coil or helical spring F, whose other end bears against the end of the casing. Now it is evident that when one bolster turns with respect to the other the balls B will be caused to move longitudinally in the casing against the tension of one of the springs F, and just as soon as the balls are relieved from their endwise strain so caused the compressed spring will expand and return the centering-heads and balls to their central and normal position.

It is to be noted that the shanks $E^3$ are of such length that their ends will abut against the ends of the casing when the ears $E^2$ are still out of contact with the ends of the guideways, so that the possibility of breaking the ears off is precluded. It is also to be understood that the lugs $A^2$ stop the inward movement of the centering-heads when the springs are still to some extent under tension, so that all rattling of the springs is prevented.

As shown in Figs. 2 and 3, I form one end of the body portion of the casing with an aperture $A^4$, in which a pin $D^2$, formed on a flange $D^3$ on the cap-plate D, is inserted, and at the other end of said body portion an undercut socket $A^5$ is formed, in which is fitted the correspondingly-shaped end of a threaded pin or bolt $D^4$, which is adapted to be inserted through the other end of the cap-plate, and preferably has a nut screwing thereon, as shown.

Having thus described my invention, what I claim as new, and desire to secure by Letters Patent, is—

1. In a device of the character described, a casing, antifriction devices movable longitudinally in said casing, and centering devices in said casing on each side of and in line with said antifriction devices, said centering devices being provided with heads in direct engagement with the antifriction devices, as set forth.

2. In a device of the character described, a casing, antifriction devices movable longitudinally in said casing, and centering devices bearing directly against the antifriction devices on each side of the latter, as set forth.

3. The combination with the casing, of the antifriction devices movable longitudinally in said casing, and spring-pressed centering-heads arranged on each side of the antifriction devices and in direct engagement therewith, as set forth.

4. In a device of the character described, a casing formed with longitudinal guideways, antifriction devices movable longitudinally in said casing, and spring-pressed centering-heads on opposite sides of said antifriction devices, said heads being formed with seats adapted to receive the end antifriction devices and being also formed with ears on opposite sides of said seats said ears being slidably fitted in the guideways, as set forth.

5. In a device of the character described, a casing formed with longitudinal guideways, balls movable longitudinally in said casing, and spring-pressed centering-heads in said casing, said heads being formed with seats adapted to engage said balls, ears slidably fitted in said guideways, and shanks adapted to abut against the ends of the casing whereby to limit the movement of the heads in one direction, as set forth.

6. In a device of the character described, a casing formed with longitudinal guideways and lugs extending across said guideways, balls movable longitudinally in said casing, centering-heads for said balls provided with ears slidably fitted in said guideways and adapted to abut against said lugs to limit the inward movement of said heads, said heads being further provided with shanks adapted to abut against the ends of the casing on the outward movement of the heads, and springs bearing against the ends of the casing and inserted over said shanks, as set forth.

7. In a device of the character described, a casing adapted to contain antifriction devices and consisting of a body portion formed at one end with an aperture and at its other end with an undercut socket, a removable pin adapted to fit in said socket, and a cap-plate for retaining the antifriction devices, said plate having a pin at one end adapted to fit in the apertured end of the body portion and an aperture arranged to receive said removable pin, as set forth.

In testimony whereof I affix my signature in the presence of two witnesses.

JOHN E. NORWOOD.

Witnesses:
CHARLES L. VIETSCH,
F. S. STITT.